(12) United States Patent
LaPierre et al.

(10) Patent No.: US 6,738,466 B1
(45) Date of Patent: May 18, 2004

(54) SYSTEM AND METHOD FOR REDIRECTING NUMBER IDENTIFICATION

(75) Inventors: Stephen R. LaPierre, Union City, GA (US); David Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 263 days.

(21) Appl. No.: 09/747,444

(22) Filed: Dec. 22, 2000

(51) Int. Cl.$^7$ ................................................ H04M 3/42
(52) U.S. Cl. ............................ 379/211.02; 379/221.08; 379/221.09; 379/221.1
(58) Field of Search ......................... 379/88.19, 373.02; 455/426

(56) References Cited

U.S. PATENT DOCUMENTS

| | | | |
|---|---|---|---|
| 5,701,301 A | 12/1997 | Weisser, Jr. | 370/428 |
| 5,920,815 A * | 7/1999 | Akhavan | 455/426 |

* cited by examiner

*Primary Examiner*—Ahmad F. Matar
*Assistant Examiner*—Karen Le
(74) *Attorney, Agent, or Firm*—Woodcock Washburn LLP

(57) ABSTRACT

Methods and system are disclosed for redirecting caller identification in an advanced intelligent network. The system comprises a service switching point and a service control point. When a redirected call is received at the service switching point, the service switching point places the call on hold and forwards a request to the service control point. The service control point recognizes that the call has been redirected and formats the caller identification information associated with the call to identify the telephone number from which the call was redirected. The re-formatted caller identification information is returned to the service switching point. The service switching point forwards the call to the destination telephone station using a distinctive ring to identify that the call has been redirected. The reformatted caller identification information, including the number of the telephone station from which the call was redirected, is forwarded to the destination telephone station.

16 Claims, 2 Drawing Sheets

SYSTEM AND METHOD FOR REDIRECTING NUMBER IDENTIFICATION

FIELD OF THE INVENTION

The present invention relates to the field of telecommunications. More particularly, the present invention relates to an intelligent or advanced application, such as an Advanced Intelligent Network (AIN) application, for identifying the source of a redirected telephone call.

BACKGROUND OF THE INVENTION

Call forwarding or redirecting services allow for subscribers to have telephone calls temporarily routed from a first number to a second number. For example, a call-forwarding subscriber may have phone calls that were originally directed to their home, forwarded to a telephone station at a vacation spot where the subscriber will be for several days. The call forwarding service allows subscribers to continue to receive their calls while away from home.

Existing caller identification services that are available for use at both analog and digital telephone stations, however, do not provide a means for users at a telephone station to which calls are being forwarded to determine whether an in-coming call was originally directed to the number or is the result of call forwarding. Such a feature would be very useful. For example, if calls are being forwarded from a telephone which is used primarily for work activities, to a telephone station that us used primarily for personal use, it would be preferably if a user could identify, prior to answering the call, whether the call is one that has been redirected from the work number.

In recent years, a number of new telephone service features have been provided by an AIN. The AIN evolved out of a need to increase the capabilities of the telephone network architecture in order to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network.

While prior AIN telephone systems have addressed numerous shortcomings in the art, they have failed to address the desire on the part of telephone operators of analog and digital phones to identify whether an in-coming call is one that has been redirected from another number. It would be highly desirable if users could identify whether an in-coming call has been redirected from another number, and if so, the number from which the call was redirected. The present invention is directed to providing such a service.

SUMMARY OF THE PRESENT INVENTION

The present invention is directed to systems and methods for providing redirecting caller identification. Redirecting caller identification provides a distinctive ring at the subscriber's telephone station to identify that an incoming call has been redirected from another number. Furthermore, information clarifying the identify of the telephone station from which the call was redirected, such as the directory number and/or a name associated with the directory number, is provided to the subscriber upon receipt of a redirected call.

According to an aspect of the invention, a system for providing redirecting caller identification comprises a service switching point and a service control point. When a redirected call is received at the service switching point, the service switching point places the call on hold and forwards a request to the service control point. The service control point recognizes that the call has been redirected and formats the caller identification information associated with the call to identify the telephone number from which the call was redirected. The re-formatted caller identification information is returned to the service switching point. The service switching point forwards the call to the destination telephone station using a distinctive ring to identify that the call has been redirected. The re-formatted caller identification information, including the number of the telephone station from which the call was redirected, is forwarded to the destination telephone station.

The above-listed features of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Generally, the present invention is directed to systems and methods for providing redirecting caller identification. Redirecting caller identification provides a distinctive ring at the subscriber's telephone station to identify that an incoming call has been redirected from another number. Information clarifying the identify of the telephone station from which the call was redirected, such as the directory number and/or a name associated with the directory number, is provided to the subscriber upon receipt of a redirected call. Exemplary AIN Network According to an aspect of the present invention, an apparatus and method for redirecting number identification may be implemented using an AIN or AIN-type network. AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Figure 1:
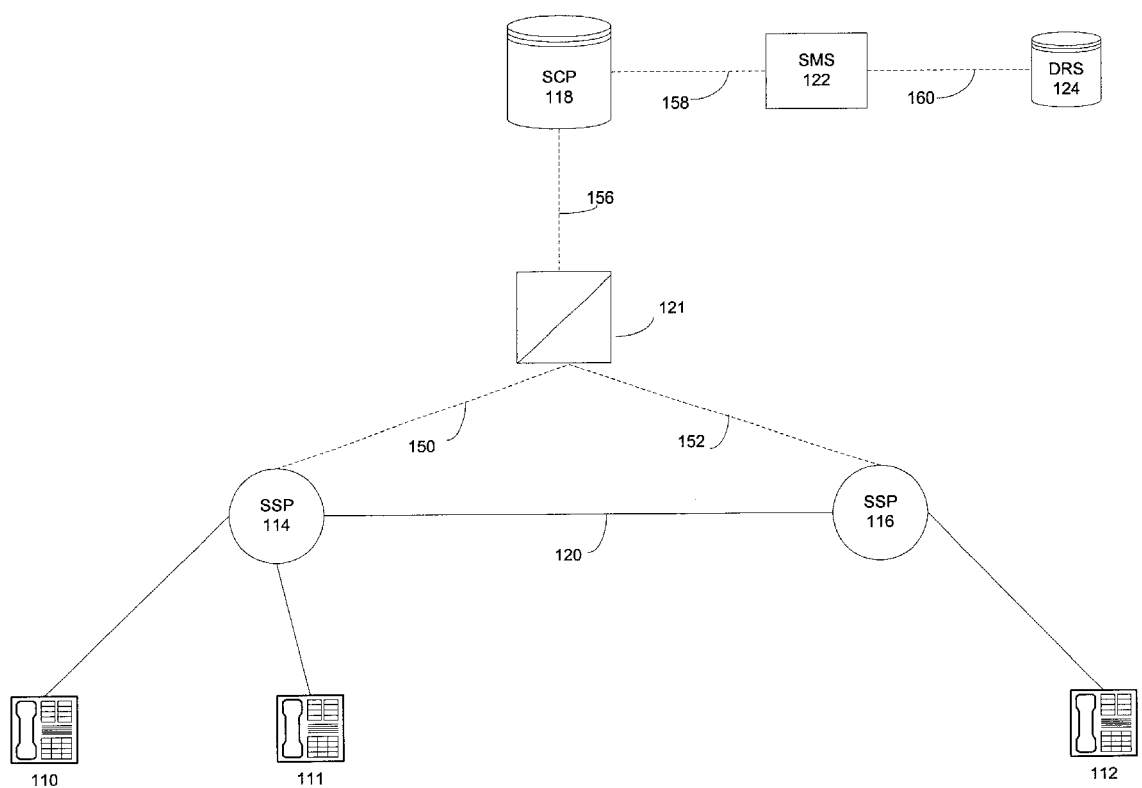
FIG. 1 illustrates, in a general block diagram form, an Advanced Intelligent Network (AIN)-based system for implementing intelligent network management features, in accordance with an embodiment of the present invention.

Referring now to the accompanying drawings, FIG. 1 illustrates a simplified AIN-based network arrangement incorporating the various features of the invention, as further described below. In the embodiment of FIG. 1, the system includes a first telephone station which for illustrative purposes will be referred to as subscriber station 110 and a second telephone station referred to as third party station 112. Stations 110 and 112 have corresponding switches, e.g., service switching points (SSP) (also known as central offices (CO)) 114 and 116. The COs 114 and 116 may comprise, for example, 1AESS or 5ESS switches. These switches may be manufactured by, for example, Lucent Technologies, Inc., or Nortel.

In the example shown in FIG. 1, each switch may include different types of facilities and/or triggers. SSPs 114 and 116 are each programmable switches which perform the following functions: recognize AIN-type calls, launch queries to service control point (SCP) 118, and receive commands and data from SCP 118 to further process and route AIN-type calls. When one of SSPs 114, 116 is triggered by an AIN-type call, the triggered SSP formulates an AIN service request and responds to call processing instructions from the network element in which the AIN service logic resides. According to an aspect of the invention, the AIN service logic may reside in a database at SCP 118.

As further shown in FIG. 1, SSP 114 is connected to SSP 116 over trunk 120. Trunk 120 may be either a SS7 controlled intermachine trunk (IMT), or primary rate interface (PRI) trunk and the type of trunk will be in accordance with both the sending and receiving SSP to which it is connected. If either of SSPs 114, 116 is a 1AESS type switch, the trunk will be an SS7 controlled IMT type trunk as the 1AESS is not capable of supporting PRI trunks. However, if both the sending and receiving switches are either a DMS-100 switch or a 5ESS switch, the trunk may be either an SS7 controlled IMT type trunk or PRI type trunk.

AIN SSPs 114 and 116 may allow normal switch processing to be suspended at specific points in a call so that the switch may send an AIN message query via signaling transfer point (STP) 120 to SCP 118. SCP 118 may execute software based service logic and return call-processing instructions to the triggering AIN SSP. New services may be provisioned by assigning AIN SSP triggers to customer lines, trunks, and/or NANP telephone numbers.

In order to facilitate signaling and data messaging, each SSP 114 and 116 is equipped with Common Channel Signaling (CCS) capabilities, e.g., SS7, which provides two-way communications of data messages over CCS links 150, 152, 154, 156, 158, and 160 between components of the AIN network. The data messages may be formatted in accordance with the Transaction Capabilities Applications Part (TCAP). Alternatively, ISDN Users Part (ISUP) may be used for signaling purposes between, for example, SSPs 114 and 116. In such a case, SSPs 114 and 116 may be equipped with the capability to map appropriate data between TCAP and ISUP protocols, and vice versa. The telephone network essentially employs an upper-level software controlled network through the STPs and the SCP (and/or ISCP). The software presides over the hardware to check the call route and the availability of connection prior to hardware connection.

Accordingly, the connections by links 150, 152, 154, 156, 158, and 160 are for signaling purposes and allow SSPs 114 and 116 to send and receive messages to and from SCP 118 via STP 120. For purposes of illustration, various features of the present invention will now be described from the standpoint of a switch implementing AIN protocols, and the CPR provisioned with TAT, 10D or DLN triggers. However, as will be apparent to those of ordinary skill in the art based on the disclosure provided herein, the present invention is not limited to implementation to a specific release of AIN protocols and may be designed and provisioned with a network utilizing triggers associated with future AIN releases and trigger types. One skilled in the art will further recognize that the above-described network is a simplified network meant for explanatory purposes. It is likely that a telephone network may comprise numerous user stations, SSPs, STPs, and SCPs along with other telephone network elements.

According to one aspect of the invention, a system for providing call forwarding identification service within an AIN or AIN-type network is provided. Subscribers to the call forwarding identification service are notified that an incoming call has been forwarded from another phone by a distinctive ringing pattern. Furthermore, the number of the telephone station from which the call was forwarded is provided to the party receiving the call. For example, a call may be placed from telephone station 110 to telephone station 111. Telephone station 111, however, may have activated a call-forwarding feature that causes calls to be routed to telephone station 112. If the call forwarding identification service has been subscribed to for telephone station 112, when the call is received at station 112 it is identified as being forwarded by a distinctive ringing signal. Furthermore, the caller identification information, in addition to identifying station 110 as the source of the call, identifies that the call was forwarded by telephone station 111. It should noted, that the call forwarding service may be provided through an AIN system to both analog and digital phones.

Redirecting Caller Identification

Figure 2:
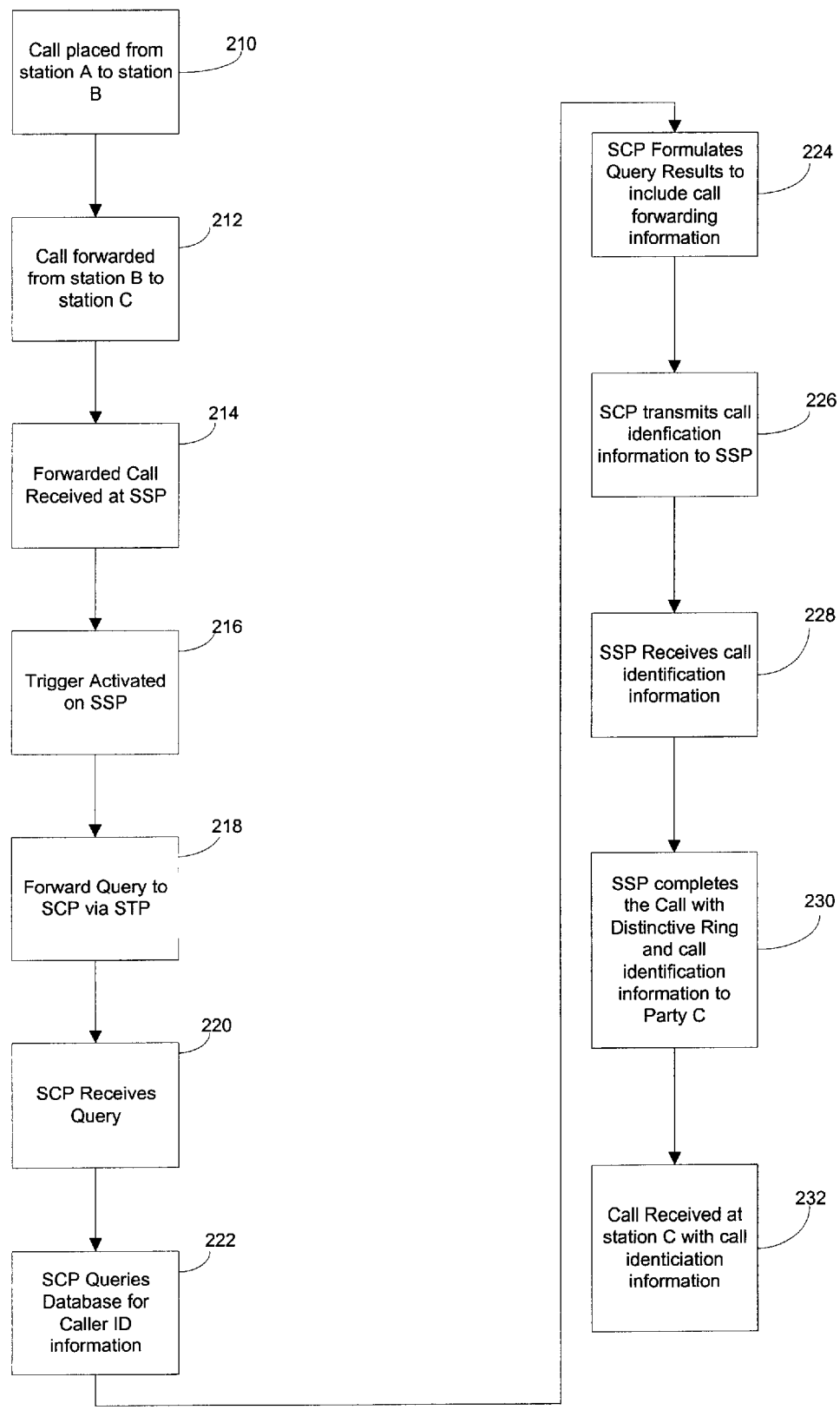
FIG. 2 illustrate an exemplary flow diagram of a process for identifying forwarded calls in accordance with an aspect of the present invention.

FIG. 2 provides a flowchart of a process for implementing a redirecting caller identification service in accordance with an aspect of the present invention. As shown, at step 210 a call is placed from telephone station 110 to telephone station 111. It is presumed that the operator of telephone station 111 has subscribed to a call forwarding service and has indicated that calls originally made to telephone station 111 be redirected to telephone station 112. Accordingly, at step 212, the call is redirected toward telephone station 112. It is presumed for the purposes of the example that telephone station 112 has subscribed to the redirecting number identification service. As a consequence, a TAT trigger is provisioned on SSP 116. At step 214, before the call reaches telephone station 112, the call is received at SSP 116 whereupon, at step 216, the TAT trigger is activated. In response to the trigger being activated, a query for redirecting caller information is formulated and, at step 218, forwarded to SCP 118. The query includes caller identification information identifying the calling number (i.e. the number associated with telephone station 110) and the redirecting number (i.e. the number associated with telephone station 111).

At step 220, SCP 118 receives the query and caller identification information. SCP 118 responds to the query by launching a logic program which is referred to herein as a service package application (SPA). At step 222, the SPA queries a database located at SCP 118 using the information contained in the TAT query. Specifically, the SPA uses the telephone number, sometimes referred to as the directory number, for station 110 to resolve a name for the calling party. At step 224, SCP 118 formulates the query results to include an indication that the call has been forwarded from telephone station 111. For example, the results may be formatted to include a notation such as "from:" followed by the directory number associated with station 111. At step 226, SCP 118 forwards the call identification information to SSP 116.

SSP 116 receives the call identification information at step 228. At step 230, SSP 116 completes the call to telephone station 112. The call is given a distinctive ring to identify to the operators of station 112 that the call has been redirected from another number. Furthermore, the call identification information, including the redirecting number, is forwarded to telephone station 112. At step 232, the operators of telephone station 112 are able to identify that the incoming call has been redirected as indicated by the distinctive ring and can identify the number from which the call was redirected using a caller identification unit.

As described above, the present invention provides systems and methods for redirecting number identification. A system in accordance with the invention provides that upon receipt of an incoming call, subscribers to the redirecting number identification service can identify that the call has been redirected as well as view the number from which the call was redirected. Subscribers to the service, because they are provided with the source of the redirected call, can selectively accept redirected calls. Further, if the subscriber decides to accept the redirected call, he/she has some context regarding the call. The redirecting caller identification service can be employed at both analog and digital telephone stations. Thus, the redirecting number identification service provides a great benefit to subscribers.

It is noted that the written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
CCIS—Common Channel Interoffice Signaling
CCS—Common Channel Signaling
CO—Central Office
CPR—Call Processing Record
CPN—Calling Party Number
DLN—Dialed Line Number
DRS—Data and Reports System
EO—End Office
ISCP—Integrated Service Control Point
ISUP—ISDN Users Part
LATA—Local Access and Transport Area
IMT-Inter-Machine Trunk
NANP—North American Numbering Plan
NPA—Numbering Plan Area
NXX—Central Office Code
PRI—Primary Rate Interface
PSTN—Public Switched Telephone Network
SCE—Service Creation Environment
SCP—Service Control PointSMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. For example, while the systems has been described with particular functions being performed by an SCP, some or all of those functions might be performed by another computing device such as, for example, an STP. Those skilled in the art, having the benefit of the teachings of this specification, may effect numerous modifications thereto and changes may be made without departing from the scope and spirit of the invention in its aspects.

What is claimed is:

1. In an advanced intelligent network, a system for identifying to a called party a telephone station from which a call has been forwarded, comprising:
   a service control point adapted to detect whether a call directed to a first telephone station has been forwarded from a second telephone station and format call signaling information to identify the second telephone station from which the call was forwarded, said call signaling information identifying to a called party a telephone station from which a call has been forwarded, and
   a service switching point in communication with said service control point, said service switching point adapted to suspend a call directed to the first telephone station and forward call signaling information associated with the call to said service control point.

2. The system of claim 1, wherein the signaling information is in SS7 format.

3. The system of claim 1, wherein said service control point is further adapted to forward signaling information designating the second telephone station from which the call was forwarded to said service switching point.

4. The system of claim 3, wherein said service switching point is further adapted to forward the call signaling information designating the second telephone station from which the call was forwarded to an end user telephone station.

5. The system of claim 3, wherein said service switching point is further adapted to cause a distinctive ringing pattern to be forwarded to an end user telephone station to identify that the call has been forwarded from the second telephone station.

6. The system of claim 1, wherein said service control point is further adapted to format the call signaling information to designate a third telephone station from which the call originated and a name associated with the third telephone station from which the call originated.

7. The system of claim 1, further comprising a signal transfer point for routing communications between said service control point and said service switching point.

8. In an advanced intelligent network, a method of identifying to a called party that a call has been forwarded from another telephone station, comprising:
   at a service switching point in communication with a first telephone station, receiving a call directed to the first telephone station and forwarding a request to a service control point to detect whether the call was forwarded from a second telephone station;
   at the service control point, detecting whether the call was forwarded from a second telephone station, and if the call was forwarded, formatting information designating the second telephone station from which the call was forwarded;
   at the service switching point, forwarding to the first telephone station the information identifying the second telephone station from which the call was forwarded.

9. The method of claim 8, wherein said act of forwarding a request to a service control point to detect whether the call was forwarded comprises activating a trigger.

10. The method of claim 8, wherein formatting information designating the second telephone station from which the call was forwarded comprises including information indicating that the call was forwarded and the phone number associated with the second telephone station from which the call was forwarded.

11. The method of claim 8, further comprising at the service switching point forwarding the call to the first telephone station using a distinctive ring identifying that the call was forwarded.

12. The method of claim 8, wherein said act of formatting information designating the second telephone station from which the call was forwarded further comprises including information identifying a third telephone station from which the call originated and a name associated with the third telephone station from which the call originated.

13. In an advanced intelligent network, a method of identifying to a called party that a call has been forwarded from another telephone station, comprising:

receiving a request to identify whether a call has been forwarded from another telephone station;

reformatting caller identification information to include an indication of the telephone station from which the call was forwarded; and forwarding the reformatted caller identification information to a called party.

14. The method of claim 13, wherein receiving a request to identify whether a call has been forwarded from another telephone station comprises receiving caller identification information identifying the telephone station from which the call originated and the telephone number from which the call was forwarded.

15. The method of claim 13, wherein reformatting caller identification information to include an indication of the telephone station from which the call was forwarded comprises reformatting caller identification information to further include a name associated with the telephone station from which the call originated.

16. The method of claim 13, further comprising querying a database to identify a name associated with the telephone station from which the call originated.

* * * * *

UNITED STATES PATENT AND TRADEMARK OFFICE
CERTIFICATE OF CORRECTION

PATENT NO. : 6,738,466 B1
DATED : May 18, 2004
INVENTOR(S) : Stephen R. LaPierre and David Scott It is certified that error appears in the above-identified patent and that said Letters Patent is hereby corrected as shown below:

<u>Title page,</u>
Item [56], References Cited, U.S. PATENT DOCUMENTS,
should read -- 4,873,717   10/1989   Davidson et al.   379/157
             6,427,010   07/2002   Farris et al.     379/221.13 --

<u>Column 2,</u>
Line 47, "Exemplary AIN Network" should be a subheading that begins a new paragraph.

Signed and Sealed this

Twentieth Day of July, 2004

JON W. DUDAS
*Acting Director of the United States Patent and Trademark Office*